United States Patent
Eaton et al.

(10) Patent No.: US 12,247,875 B2
(45) Date of Patent: Mar. 11, 2025

(54) LOW LOSS PARTIAL PHOTON NUMBER-RESOLUTION DETECTION

(71) Applicant: QC82 Inc., College Park, MD (US)

(72) Inventors: Miller Thomas Eaton, Waldorf, MD (US); Hussain Asim Zaidi, Silver Spring, MD (US)

(73) Assignee: QC82 Inc., College Park, MD (US)

( * ) Notice: Subject to any disclaimer, the term of this patent is extended or adjusted under 35 U.S.C. 154(b) by 0 days.

(21) Appl. No.: 18/506,995

(22) Filed: Nov. 10, 2023

(65) Prior Publication Data

US 2024/0167871 A1      May 23, 2024

Related U.S. Application Data

(60) Provisional application No. 63/383,468, filed on Nov. 11, 2022.

(51) Int. Cl.
   *G01J 1/44*      (2006.01)
(52) U.S. Cl.
   CPC ......... *G01J 1/44* (2013.01); *G01J 2001/4466* (2013.01)
(58) Field of Classification Search
   CPC ..... G01J 1/44; G01J 2001/4466; G06N 10/00
   See application file for complete search history.

(56) References Cited

U.S. PATENT DOCUMENTS

2022/0215069 A1*  7/2022  Guha ............... G06N 10/00

OTHER PUBLICATIONS

Dufour et al., Apr. 2017, Photon subtraction from a multimode squeezed vacuum state, Quantum Information and Measurement, DOI: 10.1364/QIM.2017.QT4B.2, 2 pp.
Nehra et al., Feb. 3, 2020, Photon-No. resolving segmented detectors based on single-photon avalanche-photodiodes, Optics Express, 28(3): 3660-3675.
Qi et al., Jan. 20, 2020, Characterizing photon No. statistics using conjugate optical homodyne detection, Optics Express, 28(2):2276-2290.

* cited by examiner

*Primary Examiner* — Georgia Y Epps
*Assistant Examiner* — Monica T Taba
(74) *Attorney, Agent, or Firm* — KNOBBE, MARTENS, OLSON & BEAR, LLP (57) ABSTRACT

Methods are disclosed for performing projective measurements combining continuous-variable quadrature and discrete photon-number-basis detections on bosonic quantum modes. Some embodiments use single-photon detectors to perform photon subtraction on a bosonic mode propagating along a waveguide prior to field measurements with homodyne detection. Methods of implementation and specific applications for quantum computation, Gaussian boson sampling, and full quantum state tomography are also disclosed.

20 Claims, 4 Drawing Sheets

FIG. 5B

US 12,247,875 B2

LOW LOSS PARTIAL PHOTON NUMBER-RESOLUTION DETECTION

INCORPORATION BY REFERENCE TO ANY PRIORITY APPLICATIONS

This application claims the benefit of priority under 35 U.S.C. § 119(e) to U.S. Provisional Application No. 63/383,468 titled "LOW LOSS PARTIAL PHOTON NUMBER-RESOLUTION DETECTION", which was filed on Nov. 11, 2022, the entire disclosure of which is expressly incorporated herein by reference.

BACKGROUND

Technical Field

This disclosure relates to performing partial photon-number-resolving detection prior to a secondary detection in an integrated photonic platform for manipulation and measurement of quantum states.

Description of Related Art

Photon-number-resolving (PNR) detection is a useful operation in many quantum information applications that use bosonic fields to encode, store, and process quantum information. In particular, PNR detection is used for generating non-Gaussian resources for quantum computation. Additionally, PNR detection may be used to verify the quantum nature of many systems, manipulate quantum states, and characterize quantum mechanical systems. PNR detection can be implemented using single photon bosonic field detectors.

SUMMARY

The systems, methods, and devices of this disclosure each have several innovative aspects, no single one of which is solely responsible for all of the desirable attributes disclosed herein. Some implementations are summarized in this section, and other implementations are disclosed elsewhere in this specification. Details of one or more implementations of the subject matter described in this specification are set forth in the accompanying drawings and the description below.

This disclosure describes systems and methods for performing partial photon-number-resolving detection prior to a secondary detection in an integrated photonic platform for manipulation and measurement of quantum states. The systems and methods described herein may be used to mitigate loss and impurity associated with other photon-number resolution methods in certain applications for manipulating quantum states.

Certain methods and systems are disclosed for performing projective measurements combining continuous-variable quadrature and discrete photon-number-basis detections on bosonic quantum modes. Some embodiments use single-photon detectors to perform photon subtraction on a bosonic mode propagating along a waveguide prior to field measurements with homodyne detection. Methods of implementation and specific applications for quantum computation, Gaussian boson sampling, and full quantum state tomography are also disclosed.

A first aspect of the present disclosure relates to a method for performing partial photon-number-resolving (PNR) detection on a bosonic mode to generate results of measuring the bosonic mode in photon number basis and at least one other basis, the method includes: coupling a portion of the bosonic mode to a plurality of single-photon detectors (SPDs), where a first portion of the coupled portion is absorbed by the plurality of SPDs to generate a result of measuring the bosonic mode in the photon number basis; combining a second portion of the coupled portion of the bosonic mode with an uncoupled portion of the bosonic mode to generate a first transmitted portion of the bosonic mode, the second portion comprising an unabsorbed portion of the coupled portion of the bosonic mode. The method further comprises, performing an operation on a final transmitted portion of the bosonic mode to generate the result of measuring the bosonic mode in the at least one other basis, where the final transmitted portion of the bosonic mode comprises at least the first transmitted portion of the bosonic mode.

A second aspect of the present disclosure relates to the method of the first aspect where the operation comprises homodyne detection.

A third aspect of the present disclosure relates to a method for bosonic non-Gaussian quantum state engineering, the method includes: providing a quantum state entangled across one or more bosonic modes; and performing a partial photon-number-resolving (PNR) detection on the bosonic mode using the method of the second aspect to project the one or more bosonic modes of the quantum state into a non-Gaussian state; where the result of measuring the bosonic mode in the photon number basis comprises detection of at least one photon.

A fourth aspect of the present disclosure relates to a method for performing a quantum sampling problem that is intractable using a classical computing method, the method includes: preparing a plurality of bosonic modes each having an initial state; performing a unitary transformation on the bosonic modes by transmitting the bosonic modes through a multi-mode interferometer and at least one phase shifter to generate transformed bosonic modes having transformed states; and performing the partial photon-number-resolving (PNR) detection on at least one transformed bosonic mode using the method of the second aspect.

A fifth aspect of the present disclosure relates to a method for performing quantum state tomography of a quantum state of a bosonic mode by at least preparing a matrix equation for calculating a density matrix associated with the quantum state, the method includes: generating a plurality of replicated bosonic modes each having a quantum state identical to the quantum state; performing a partial photon-number-resolving (PNR) detection on each of the plurality of replicated bosonic modes of the plurality of replicated bosonic modes using the method of the second aspect; receiving outcomes of performing the operation (e.g., the partial PNR) on the final transmitted portion of each of replicated bosonic modes by a classical computing system, where the outcomes comprise quadrature and photon number measurement results, and where the classical computing system comprises at least one hardware processor; processing the outcomes by the hardware processor to generate a measurement statistic of the quadrature and photon number measurement results; receiving the measurement statistics; and preparing, by the hardware processor, the matrix equation having a form $M-C \times P=0$, where M comprises the measurement statistics, C comprises a fixed coefficient matrix, and P comprises the density matrix associated with the quantum state of the bosonic mode.

A sixth aspect of the present disclosure relates to a method for performing partial photon-number-resolving (PNR) detection on a bosonic mode to generate results of measuring the bosonic mode in photon number basis and at least one other basis; the method includes: coupling a portion of the bosonic mode to a plurality of single-photon detectors (SPDs) to generate the result of measuring the bosonic mode in the photon number basis; generate a transmitted portion of the bosonic mode using an uncoupled portion and an unabsorbed portion of the coupled portion of the bosonic mode; and performing an operation on the transmitted portion of the bosonic mode to generate the result of measuring the bosonic mode in the at least one other basis.

A seventh aspect of the present disclosure relates to a quantum measurement system configured to perform partial photon-number-resolving (PNR) detection on a bosonic mode to generate results of measuring the bosonic mode in photon number basis and at least one other basis, the quantum measurement system includes: a plurality of single-photon detectors (SPDs) configured to receive a coupled portion of the bosonic mode and partially absorb the coupled portion to generate the result of measuring the bosonic mode in the photon number basis; and a complementary measurement system configured to perform an operation on a transmitted portion of the bosonic mode to generate the result of measuring the bosonic mode in the at least one other basis, where the transmitted portion of the bosonic mode comprises an uncouple portion and an unabsorbed portion of the coupled portion of the bosonic mode.

An eight aspect of the present disclosure relates to a quantum measurement system configured to perform partial photon-number-resolving (PNR) detection on a bosonic mode to generate results of measuring the bosonic mode in photon number basis and at least one other basis, the quantum measurement system includes: a plurality of single-photon detectors (SPDs) configured to receive a coupled portion of the bosonic mode and absorb a first portion of the coupled portion to generate the result of measuring the bosonic mode in the photon number basis; and a complementary measurement system configured to perform an operation on a final transmitted portion of the bosonic mode to generate the result of measuring the bosonic mode in the at least one other basis, where the final transmitted portion of the bosonic mode comprises at least a first transmitted portion of the bosonic mode; where the first transmitted portion of the bosonic mode comprises at least an uncoupled portion of the bosonic mode and an unabsorbed second portion of the coupled portion of the bosonic mode.

In some embodiments, the operation in any one of the aspects described above comprises a quantum measurement in a quadrature basis (e.g., P-basis or Q-basis), homodyne detection, another partial PNR detection followed by, e.g., a homodyne detection, a complementary operation that generates additional or complementary information associated with the photons, or interfering a transmitted portion (e.g., the final transmitted portion) with an ancillary bosonic mode to generate two output bosonic modes and performing a balanced homodyne detection based on the two output bosonic modes.

A ninth aspect of the present disclosure relates to a method for performing distributed photon-number-resolving (PNR) detection on a bosonic mode to generate results of measuring the bosonic mode in photon number basis, the method includes: coupling a portion of the bosonic mode to a plurality of single-photon detectors (SPDs), where a first portion of the coupled portion of the bosonic mode is absorbed by the plurality of SPDs; combining a second portion of the coupled portion of the bosonic mode with an uncoupled portion of the bosonic mode to generate a first transmitted portion of the bosonic mode, the second portion comprising an unabsorbed portion of the coupled portion of the bosonic mode; coupling a portion of the first transmitted portion to the plurality of single-photon detectors (SPDs), where a first portion of the coupled portion of the first transmitted portion is absorbed by the plurality of SPDs; combining a second portion of the coupled portion of the first transmitted portion with an uncoupled portion of the first transmitted portion to generate a second transmitted portion of the bosonic mode, the second portion of the coupled portion of the first transmitted portion comprising an unabsorbed portion of the coupled portion of the first transmitted portion; and generating the results of measuring the bosonic mode in photon number basis based at least in part on signals generated by the plurality of SPDs upon absorbing the first portion of the coupled portion of the bosonic mode and first portion of the coupled portion of the first transmitted portion of the bosonic mode.

BRIEF DESCRIPTION OF THE DRAWINGS

The systems, methods, and devices of this disclosure each have several innovative aspects, no single one of which is solely responsible for all of the desirable attributes disclosed herein. Details of one or more implementations of the subject matter described in this specification are set forth in the accompanying drawings and the description below.

DETAILED DESCRIPTION

Although certain embodiments and examples are disclosed below, inventive subject matter extends beyond the specifically disclosed embodiments to other alternative embodiments and/or uses and modifications and equivalents thereof.

Quantum computation (QC) holds the potential to solve problems intractable to classical computation by coherently manipulating quantum information across large-scale entangled states. Implementations, however, remain challenging due to the presence of errors, quantum decoherence, and difficulties in scaling the number of resource qubits.

Measurement-based QC over continuous variable (CV) cluster states is an alternative method of quantum computing that may solve some of the existing problems through the use of massively scalable CV cluster states, which can be experimentally generated, e.g., at room temperature and in optical domain. Such CV cluster states may have tens to thousands or millions of entangled qumodes, the equivalent of qubits in discrete QC. Under this paradigm, the cluster state acts as an up-front resource substrate for QC, where all calculations are enacted through measurements on the substrate.

CV cluster states may comprise a plurality of entangled qumodes (e.g., entangled optical fields) where each mode is entangled to neighboring qumodes. In some cases, CV cluster states may comprise position-quadrature and momentum-quadrature entangled qumodes. In some cases, these qumodes may be implemented by entangling squeezed states of light via two-mode entanglements. In some cases, a squeezed sate may comprise a finitely squeezed vacuum state. In some cases, despite the finite squeezing of the initial states, CV cluster sates may be used in fault-tolerant universal QC, provided they are supplemented with non-Gaussian resource states or gates.

In some cases, a quantum cluster may comprise a plurality of entangled modes or qumodes. In some cases, a mode or a qumode may comprise an optical field (e.g., a resonant optical field in an optical cavity). In various embodiments disclosed herein, an entangled state, a two-qumode entangled state, a cluster state, or other quantum states, may comprise a state of one or more modes, one or more qumodes. For example, two entangled modes may comprise two optical fields that are in an entangled state, and a quantum cluster may comprise a plurality of optical fields being in a cluster state. In some examples, a cluster state may comprise a canonical cluster state comprising Gaussian states. In some cases, a cluster state may be represented by a graph (herein referred to as a cluster graph) comprising nodes where a node represents a qumode, a.k.a. a mode of the cluster state. As such, the state of a node may represent the state of the corresponding mode, a.k.a. qumode, and the operations performed on the cluster state may be interchangeably expressed based on modes or nodes. For example, teleporting a mode or performing a homodyne measurement on a mode may be expressed as teleporting a respective node or performing a homodyne measurement on the respective node (in the cluster graph). In some cases, a quantum cluster may comprise a plurality of entangled modes or nodes of a hybrid nature, where some nodes may represent modes or qumodes comprising optical fields while other nodes may represent bosonic fields in other physical manifestations including but not limited to microwave fields in superconducting cavities or motional degrees of freedom of trapped ions, and still other nodes may represent discrete qubits such as transmons, trapped ion, quantum dots, or other qubit implementations. In the method described below, performing an operation on a node, on a mode, can refer to performing the operation on the optical field (light) associated with the mode or node, or on the quantum state of the node or the mode. In some implementations, the methods described below may be used to introduce and control non-Gaussian states in a CV cluster state or a CV portion of a hybrid cluster state. In some cases, the method described below may be applied to nodes that are entangled to one or more discrete qubits.

Photon-number-resolving (PNR) detection is an important operation in many bosonic quantum information applications—in particular, where non-Gaussian resources are required to achieve a quantum advantage over classical computing systems. Additionally, PNR measurements may be used to verify the quantum nature of many systems and to characterize and/or manipulate complex quantum mechanical systems. Although field detectors, such as those used for homodyne detection, can be made with quantum efficiency (QE) nearing 100% at room temperature, practical implementations of PNR detection based on these field detectors is not obvious.

Examples of high-efficiency PNR detectors include transition-edge sensors (TESs) and superconducting nanowire single-photon detectors (SNSPDs). While most PNR detectors operate in cryogenic temperatures, certain single-photon detectors may operate at room temperature.

In some embodiments, a PNR detector may comprise a distributed detector. In some examples, a distributed detector comprises a plurality of photon detecting elements. In some cases, a photon detecting element may be configured to generate an electronic signal when one or more photons are absorbed from a bosonic field or mode. For example, a photon detecting element may comprise a single-photon-detector (SPD) configured to detect bosonic fields with single photon resolution. In some cases, an SPD may comprise a single photon avalanche diode (SPAD).

In some cases, the bosonic mode can be an optical mode comprising photons having frequencies in an optical frequency range (e.g., deep-UV, UV, visible, or IR). In some such cases, the photon detecting element can be a photometer or an optical-to-electrical converter. In some examples, the photodetector may comprise a semiconductor photodetector. The semiconductor photodetector may include at least one semiconductor junction (e.g., pn-junction). The semiconductor may comprise silicon or a compound semiconductor (e.g., for example including Illy compound semiconductors).

In some cases, each of the plurality of photon detecting elements may receive a separate portion of a bosonic mode and detect the photons in the received portion of the bosonic field. For example, n photons may be divided among m photon detecting elements. Advantageously, dividing a bosonic mode into plurality of portions and detecting each portion using a separate photon detecting element may allow detecting a large number of photons using a plurality of photon detecting elements (e.g., a plurality of SPDs) with a lower dark current and a smaller number of undetected (or lost) photons compared to sending the entire bosonic mode to a single photon detecting element.

In some implementations, the plurality of photon detecting elements may serially absorb photons from a bosonic mode. For example, a first photon detecting element may receive a first portion of the bosonic mode and a second photon detecting element may receive a second portion of the bosonic mode, not received (or not detected) by the first photon detecting element, after first portion is received by the first photon detecting element. Different photon detecting elements can be coupled to the bosonic mode with different coupling coefficients and the coupling coefficient of one or more photon detecting elements to the bosonic mode can be adjustable. Advantageously, having adjustable coupling coefficients may allow reducing the number of photons lost through the detection process, for example, by adjusting the coupling coefficients so that the unabsorbed photons left in different portions of bosonic mode can constructively interfere with an uncoupled portion of the bosonic mode.

In some embodiments, the bosonic mode may comprise a guided bosonic mode propagating in a waveguide (e.g., an on-chip optical waveguide). In some embodiments, the guided bosonic mode may comprise a guided optical wave propagating in an optical waveguide and the plurality of photon detecting elements may comprise a plurality of single photon photodetectors coupled (e.g., evanescently coupled) to the optical waveguide. In some examples, the optical waveguide can be a monolithically fabricated ridge or buried optical waveguide. However, other implementations are possible.

In some embodiments, a distributed photodetector may include a segmented photodetector comprising a plurality of single-photon avalanche photodiodes (single photon detectors) evanescently coupled to an optical waveguide.

In some cases, each of the photon detecting elements of a distributed detector, or the segments of a segmented photodetector may introduce negligible loss and operate at a high-speed. For example, a photon detecting element can have a bandwidth larger than 1 MHz, larger than 100 MHz, larger than 1 GHz, larger than 5 GHz, larger than 10 GHz, or greater values. An example of a segmented photodetector for PNR detection at room temperature is described in the publication titled "Photon-number-resolving segmented detectors based on single-photon avalanche-photodiodes" by R. Nehra et al., Optics Express, Vol. 28, No. 3 (2020), (https://opg.optica.org/oe/fulltext.cfm?uri=oe-28-3-3660), the entire contents of which is incorporated by reference herein and made a part of this specification. In some implementations, such design may include a large number of single photon photodetectors to absorb and detect nearly all photons in a given bosonic mode (optical mode). Coupling a large number of single photon photodetectors (e.g., 100-10000) to an optical waveguide may increase optical loss, noise, the size of the detection system, and the complexity of the fabrication process. However, when a small number of the photodetectors (e.g., 10-100) are coupled to the optical waveguide, a large number of photons may pass through the waveguide without being absorbed.

in some of the disclosed embodiments, the serial distributed detection process described above, may be performed before another complementary operation on the bosonic field or mode such that the complementary operation can use the photons (e.g., unabsorbed or undetected photons) to generate additional or complementary information associated with the photons and therefore the bosonic field. In some cases, the other operation may comprise a quantum measurement such as another detection process on the unabsorbed portion or a transmitted portion of the bosonic mode. In some examples, the transmitted portion of the bosonic mode comprises a portion that is not coupled to the distributed photodetector and a portion that is coupled to the distributed photodetector but it is not absorbed by any of its photon detecting elements. In some cases, the quantum measurement may comprise homodyne photon detection. In some examples, the additional or complementary information may comprise a photon correlation function. In some examples, the measurement may comprise a quadrature measurement.

In some implementations, the distributed detection process may comprise a quantum measurement in photon number basis and the complementary operation may comprise a quantum measurement in a quadrature basis (e.g., P-basis or Q-basis).

In some cases, the distributed (e.g., segmented) detector may comprise single-photon avalanche photodiodes (SPADs) or superconducting nanowire single-photon detectors (SNSPDs). Each photodetector may be weakly coupled to the optical waveguide, in which the optical mode (bosonic mode) propagates so that probability to absorb more than a single photon in each detection element is negligible.

In some embodiments, the distributed detection process may comprise a partial PNR detection where photon-number distribution of a bosonic mode followed by another operation or measurement (e.g., a quadrature measurement). In some examples, a quantum system may comprise a partial PNR detector configured to detected a first portion of a bosonic mode (e.g., an optical mode) using a distributed detector (e.g., a distributed or segmented photodetector) and transmit a second portion of the bosonic mode to a measurement device configured to perform the operation (e.g., a homodyne detection) on the second portion of the bosonic mode.

In some cases, the second portion may comprise an unabsorbed portion of the bosonic mode received from the distributed detector and a portion directly transmitted without being coupled to the distributed detector.

In some cases, the operation may include a homodyne detection in quadrature basis (e.g., P-bases or a Q basis). As such, partial PNR detection may measure a first portion of the bosonic mode in a photon number basis (e.g., using the SPDs), a second portion the bosonic modes in a quadrature basis. In some cases, full photon number resolution requires a large number of SPDs (e.g., 1000 s of SPADs for detecting 50 photons or less); however, when partial PNR detection is used a portion of the photons are detected using a relatively small number of SPDs (e.g., 5 to 50 SPADs) to generate measurements in photon number basis, and the unabsorbed photons may be measured using a homodyne detector (e.g., a balanced homodyne detector) to generate measurements in quadrature basis. In some embodiments, the measurements in quadrature basis can be correlated to the measurements in photon number basis. As such, combining the measurements in quadrature basis and the measurements in photon number basis, generated by a partial PNR detection scheme, may be used to determine statistics of the quantum state of the bosonic mode (e.g., photon statistics in the optical mode).

In some embodiments, the distributed detector may comprise a plurality of SPDs individually coupled to the bosonic mode (e.g., via a common waveguide). In some cases, the bosonic mode may comprise a guided optical mode propagating in an optical waveguide and the plurality of SPDs individually may be coupled (e.g., evanescently coupled) to the optical waveguide. In various implementations, the SPD may comprise a SPAD (e.g., a semiconductor SPAD).

In some embodiments, a portion of the bosonic mode that is coupled to an SPD and it is not absorbed (detected) by the SPD may be coupled back to the bosonic mode (e.g., the guided optical mode propagating in an optical waveguide).

In some cases, a portion of the bosonic mode that is not coupled to the SPD may be combined with an unabsorbed portion coupled back from the SPD. For example, when the bosonic mode comprises an optical mode propagating in an optical waveguide a first portion of the optical mode may be evanescently coupled to a SPAD via a coupling junction and a second portion may pass through the coupling junction (without being coupled to the SPAD). A portion of the first portion (evanescently coupled portion) of the optical mode that is not absorbed by the SPAD may be coupled back to the optical waveguide and can be combined and/or interfere with the second portion of the optical mode to generate a transmitted portion of the optical mode. In some cases, for a given number of photons in the optical mode, a coupling coefficient between the SPAD and the optical waveguide may be configured such that the probability of coupling more than one photon to the SPAD is negligible. Alternatively or in addition, the coupling coefficient between the SPAD and the optical waveguide may be adjusted to reduce photon loss (e.g., such that the first and the second portions interfere constructively).

In some cases, m SPADs may be coupled to an optical waveguide via m coupling junctions along the optical waveguide. In some cases, a distance between two coupling junctions may be configured to improve an overall quantum efficiency of the distributed detector or the distributed detection process. For example, a distance between two coupling junctions may be configured according to a beat length of the optical mode. The transmitted portion of the optical mode generated by each SPAD may be directed to the next SPAD located at the next coupling junction. In some cases, the output of the distributed detector (e.g., the plurality of SPADs) may comprise the transmitted portion of the optical mode generated by the last SPAD.

In some implementations, the transmitted portion of the optical mode generated by the last SPAD of a distributed photodetector may be directed back to one or more of the plurality of the SPADs for further photon absorption. In some such implementations, the optical mode may be recirculated through a portion of the waveguide coupled to the SPADs multiple times and the output of the distributed detector may comprise the transmitted portion of the optical mode generated by the last SPAD after a last roundtrip along the portion of the waveguide coupled to the SPADs. In some implementations, the transmitted portion of the optical mode generated by the last SPAD of a first distributed photodetector may be directed to another photodetector (e.g., a second distributed photodetector) for further photon absorption.

In some embodiments, a complementary operation may be performed on the output of the first or the second distributed photodetector. In some case, the complementary operation may comprise a homodyne detection. In some cases, a complementary operation may be correlated with the signals generated by the SPADs.

In some cases, controlling the coupling between the SPADs, a total number of SPADs, or a number of times the optical mode (the bosonic mode) passes through a portion of the waveguide coupled to the distributed detector, allows tailoring a quantum operation (e.g., measurement) comprising detection of photons by the distributed photodetector and the complementary operation performed on photons that are not detected by the distributed detector. For example, the quantum operation can be a measurement performed in the photon-number basis, in a quadrature basis, or a combination of photon-number basis and a quadrature basis. Performing a quantum measurement on a bosonic mode in a combination of photon-number basis and a quadrature basis may enable performing customized measurements having certain statistical properties not accessible, e.g., using quantum measurement in a single basis. Additionally, this method may mitigate the need for using high-efficiency terminal PNR detectors (photodetectors that receive the entire bosonic mode) in some applications.

In some embodiments, a partial PNR detection system may comprise a distributed detector having n SPDs (e.g., SPADs) configured to detect m photons with high probability (e.g., greater than 50%, greater than 70%, or greater than 90%). In some such cases, n/m can be from 20 to 50, from 50 to 70, or from 70 to 100.

Projecting part of an entangled quantum state on the photon-number basis allows for the creation of specific quantum resources necessary for continuous-variable quantum computation, quantum error correction, and purification of quantum states for various quantum information protocols. Additionally, PNR measurements have been shown to be useful for quantum state tomography and for generating cat states when used to subtract photons from squeezed vacuum states.

When photon subtraction is considered, generally one uses a weakly reflective beam splitter to siphon off a small percentage of a quantum state and send that fraction of light to a PNR detector. The number of photons registered by the PNR measurement is then the number of photons subtracted, where the Kraus operator for photon subtraction is given by $$\hat{S}_n = \frac{(-1)^n e^{-n\beta/2}}{\sqrt{n!}} (2\sinh\beta)^{n/2} \hat{N}(\beta) \hat{a}^n,$$

where $\hat{a}$ is the bosonic annihilation operator and $\hat{N}(\beta)$ is the damping operator defined by $$\hat{N}(\beta) := e^{-\beta \hat{a}^\dagger \hat{a}} = e^{-\frac{\beta}{2}(\hat{Q}^2 + \hat{P}^2 - 1)},$$

where $\hat{Q}, \hat{P}$ are the bosonic quadrature operators, and $\beta$ is related to transmission coefficient of the beam splitter, t, with $\beta = -\ln(t)$ and $r^2 + t^2 = 1$. In this case of photon subtraction, the PNR detector must be nearly ideal. All photons present in the reflected mode must be detected or the purity of the measurement suffers and causes the state to decohere. Performing PNR detection by evanescently coupling many single photon detectors to a waveguide in a segmented detection scheme allows passing light coupled to each detector through a weak absorption layer with the possibility of triggering the single photon detector to detect a photon, and returning undetected light to the waveguide. In some cases, this process occurs when the single photon detectors are appropriately spaced to correspond to the beat length of the traveling wave so that the light couples to each single photon detector and returns to the waveguide along the entire length of the segmented detection scheme. This can allow one to perform PNR with an overall high quantum efficiency even when individual single photon detectors have lower quantum efficiency. However, because each single photon detector is weakly absorbing to ensure the probability of more than a single-photon absorption is negligible, many single photon detectors may be used to detect all of the photons present in the input light and maintain the purity of the measurement operator.

In some implementations, to mitigate the issue of requiring many detectors, the beam splitter used in the existing photon subtraction methods can be discarded in favor of optically coupling a segmented detector to the waveguide (e.g., by directly placing the segmented photodetector on the optical waveguide that guides the optical field from which the photons are subtracted). In some such implementations, the segmented detector may not be configured to resolve all of the photons in the mode, but instead just to detected and measure some of them. In some cases, this scheme amounts to a partial PNR operation, which is identical to the photon subtraction Kraus operator described above, where β is now a fixed parameter that is a function of the coupling and absorption of all of the single photon detectors in the segmented detector.

In some embodiments, this partial PNR operation can be followed (e.g., immediately followed) by other quantum operations, such as further detection. For example, after sending the quantum state (e.g., the optical field having the quantum state) along the waveguide optically coupled to the segmented detector (e.g., to perform partial PNR), the output optical field could be sent to a homodyne detection system to perform homodyne detection sby interfering the output optical field with a classical local oscillator (LO) and sending the resulting optical fields (e.g., two output optical fields resulting from the interference) to a pair of optical field detectors (e.g., two photodetectors). In some embodiments, the classical phase of the LO determines the quadrature to be measured. In some such embodiments, a device that performs the process described above, can be directly used in a Photon-counting-Assisted Node-Teleportation Method (PhANTM), where photons are subtracted immediately prior to a homodyne-based teleportation measurement.

In some cases, given that optically coupling the segmented photodetector to a waveguide (e.g., placing the segmented detector along the waveguide) can be effectively described as a photon subtraction operation, there are several ways to represent the measurement operation comprising partial PNR followed by homodyne detection. The simplest form of the projection operator can be given by:

$$\hat{O} = {}_2\langle 0|\hat{B}_{12}|x\rangle_{A_{\theta_1}} |n\rangle_2 \langle n|_{A_{\theta_1}} \langle x|\hat{B}_{12}|0\rangle_2,$$

where $\hat{B}_{12}$ is a fictitious beam splitter with coefficients r, t such that $r^2+t^2=1$ used as a stand-in for the coupling to the segmented detector, n is the total number of photons registered by segmented detector, and x is the result of the homodyne measurement performed in the quadrature $\hat{A}(\theta) = \hat{P}\cos(\theta)+\hat{Q}\sin(\theta)$. By considering the photon-number detections as a photon subtraction process, this operator can be re-expressed as:

$$\hat{O}=\hat{S}_n(|x\rangle\langle x|)_{A_\theta}\hat{S}_n,$$

where $\hat{S}_n$ n is the Kraus operator for subtracting n photons. For a projective measurement such as this, one can also imaging the homodyne detection as occurring first in the mathematics. In this case, the operator will remain the same, but it can be represented different which may illuminate further use cases. For example, when the quadrature detection angle is equal to zero ($\theta=0$), then the operator can be written as $$\hat{O} = \hat{Z}^\dagger(rx)\hat{S}^\dagger(-lnt)e^{-\frac{(tx+r\hat{P})^2}{2}}|n\rangle\langle n|e^{-\frac{(tx+r\hat{P})^2}{2}}\hat{S}(-lnt)\hat{Z}(rx)$$

where x is the result of the homodyne measurement, r and t are the coefficients of the fictitious beam splitter, $$\hat{S}(-lnt) = e^{-\frac{1}{2}lnt(\hat{a}^{\dagger 2}-\hat{a}^2)}$$

is the single-mode squeezing operator, and $$\hat{Z}(rx) = e^{irx\hat{Q}}$$

is the shift operator, or displacement, for the $\hat{P}$ quadrature.

Figure 1:
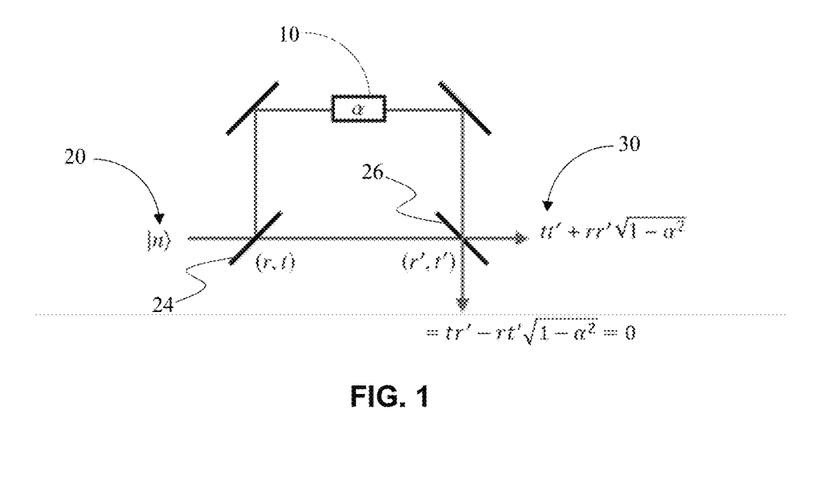
FIG. 1 is a diagram illustrating the coupling of a bosonic mode to a photon detecting element and generation of a transmitted portion of the bosonic mode.

FIG. 1 is a diagram illustrating the coupling of a bosonic mode 20 to a photon detecting element 10 (e.g., a SPD, or a photon detecting region or layer) and generation of a transmitted portion 30 of the bosonic mode. The photon detecting element 10 can be a photon detecting element of a plurality photon detecting elements that absorb photons from a portion of the bosonic mode 20, e.g., in series. In some cases, the bosonic mode 20 can be a guided bosonic mode propagating in a waveguide (e.g., optical photons propagating in an optical waveguide). In some cases, the waveguide can be an on-chip optical waveguide. In some such cases, the photon detecting elements (e.g., SPDs) can be integrated with the optical waveguide. In some examples, the SPDs may comprise SPADs (e.g., semiconductor SPADs comprising silicon or Illy material). In some implementations, each single photon detector (SPD) may be coupled to the waveguide by a vertical directional coupler that can be tuned to adjust a coupling coefficient between the SPD and the waveguide. The vertical directional coupler may be modeled as a pair of beam splitters 24, 26 with reflection and transmission coefficients (r, t, r', and t'). The absorption (e.g., an effective absorption) of the photon detecting element 10 may be given by an absorption coefficient α. In some cases, tuning the coupling (e.g., the reflection and transmission coefficients of the beam splitters 24, 26) based on the absorption coefficient α of the photon detecting element 10, may allow for destructive interference between the optical field transmitted through the first beam splitter 24 and reflected by the second beam splitter 26, and the optical field received from the photon detecting element 10 and transmitted through the second beam splitter 26 resulting in return of nearly all unabsorbed light to the waveguide or negligible or no leakage due to photon loss.

Figure 2A:
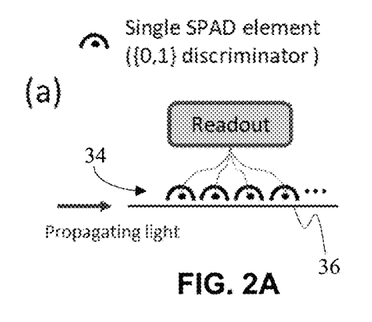
FIG. 2A illustrates a distributed photodetector coupled to an optical waveguide
Figure 2B:
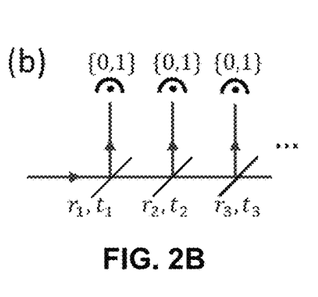
FIG. 2B is a diagram illustrating coupling of a bosonic mode to a plurality of single photon detectors via a plurality of couplers.
Figure 2C:
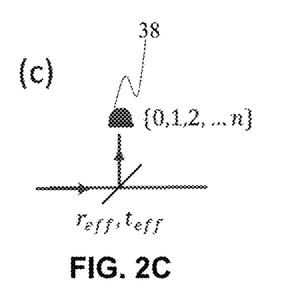
FIG. 2C is a diagram illustrating a photon-number-resolving detector coupled to bosonic mode via a single coupler, representing the coupling of the bosonic mode to the plurality of single photon detectors shown in FIG. 2B.

FIG. 2A illustrates a distributed (or segmented) photodetector 34 coupled to an optical waveguide 36. The distributed detector 34 may include multiple single photon detector elements coupled to a waveguide each with the capability to differentiate between a vacuum (zero photons) and non-vacuum (one or more photons) is shown. The distributed photodetector 34 coupled to the optical waveguide 36, shown in FIG. 2A may be equivalently represented by a series of photon subtraction attempts as shown in FIG. 2B that is a diagram illustrating coupling of a bosonic mode to a plurality of single photon detectors (SPDs) via a plurality of couplers (represented by three beam splitters). In some embodiments, some or all SPDs in FIG. 2B may have ideal quantum efficiency and may be weakly coupled to the waveguide 36 such that probability of coupling more than one photon to the SPD is negligible. The diagram in FIG. 2B may be further simplified and represented as a single effective photon subtraction device as shown in FIG. 2C. FIG. 2C is a diagram illustrating a photon-number-resolving detector 38 coupled to bosonic mode via a single coupler (e.g., a single beam splitter) representing the coupling of the bosonic mode to the plurality of single photon detectors shown in FIG. 2B. In some cases, light is coupled from the waveguide 36 to the photon-number-resolving detector 38 with perfect efficiency that registers the total number of photons measured across all single photon detectors. The effective coupling parameters (e.g., the effective reflection and transmission coefficients, $r_{eff}$, $t_{eff}$, of the beam splitter) can be a composite function of all individual coupling parameters for individual single photon detector elements along the distributed (or segmented) detector 34.

Figure 3A:
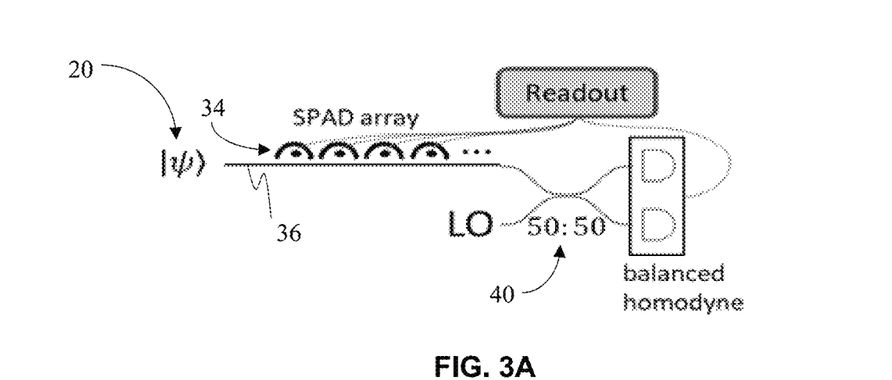
FIG. 3A illustrates an example partial photon-number-resolving (PNR) measurement system for measuring a bosonic mode, which includes a distributed photodetector coupled to an optical waveguide, a beam splitter that splits a transmitted portion of the bosonic mode between two outputs, and a balanced homodyne detector that receives the outputs.

FIG. 3A illustrates an example partial photon-number-resolving (PNR) measurement system for measuring a bosonic mode, which includes a distributed photodetector 34 coupled to an optical waveguide 36, a directional coupler or a beam splitter 40 (e.g., a 50/50 directional coupler) that splits a transmitted portion of the bosonic mode, received by a first input port of the directional coupler 40, between two output ports of the, and a balanced homodyne detector that receives the light output via the two output ports of directional coupler 40. In some cases, a local oscillator (LO) may be provided to a second input port of the directional coupler 40 and be coupled by the directional coupler (or beam splitter) 40 to the two output ports as an ancillary coherent state (classical reference field) that is used for controlling the angle of the homodyne measurement.

Figure 3B:
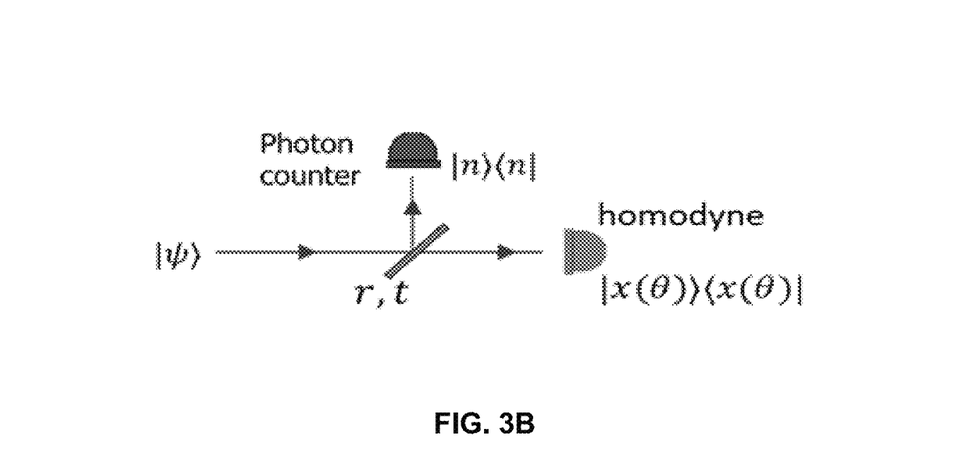
FIG. 3B is a diagram illustrating an equivalent partial (PNR) measurement system, representing the PNR measurement system of FIG. 3A.

FIG. 3B is a diagram illustrating an equivalent partial (PNR) measurement system, representing the PNR measurement system of FIG. 3A. In some examples, partial photon-number-resolving detection in the form of an n-photon subtraction can be implemented by a segmented or distributed photodetector and can be followed by a quadrature measurement of $x(\theta)$, where $\theta$ is determined by the phase of the classical reference optical field. In some embodiments, the strength of coupling to the individual single photon detectors in the segmented detector (effective r, t) can be tuned to control the projection of a quantum state into the photon-number basis or into the quadrature basis.

In some embodiments, the more photon counters and/or beam splitters may be added before the homodyne detection.

Figure 4A:
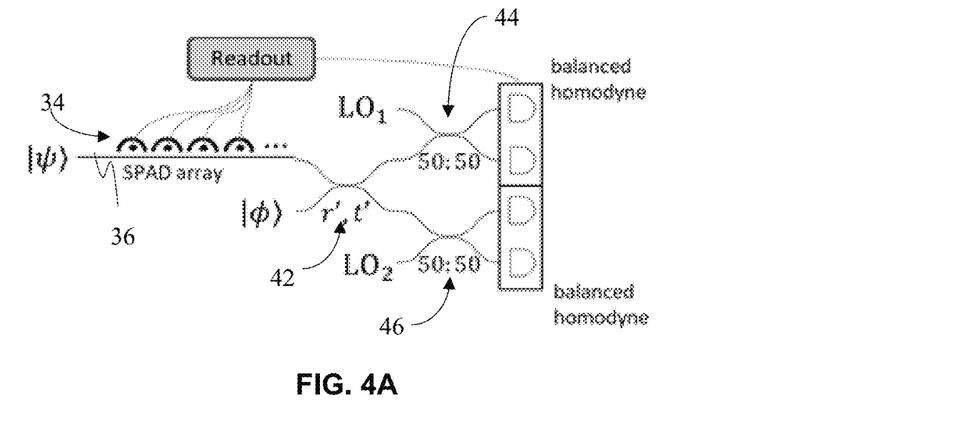
FIG. 4A illustrates an example partial photon-number-resolving (PNR) measurement system for measuring a bosonic mode, which includes a distributed photodetector coupled to an optical waveguide, three beam splitters that split a transmitted portion of the bosonic mode between four outputs, and two balanced homodyne detectors that receive the outputs.

FIG. 4A illustrates an example partial photon-number-resolving (PNR) measurement system for measuring a bosonic mode 20 using dual homodyne detection, which includes a distributed photodetector 34 coupled to an optical waveguide 36, three beam splitters (or directional couplers) 42, 44, 46 that split a transmitted portion of the bosonic mode 20 between two outputs, and two balanced homodyne detectors that receive the outputs of the second and third beam splitters 44, 46. The first beam splitter 42 splits a transmitted portion of the bosonic mode between two output ports and couples an ancillary quantum state |φ> to the same output ports. Light output from each output port of the first beam splitter 42 is then divided between two photodetectors of a balanced homodyne detector of a pair of balanced homodyne detectors, by the second or the third beam splitters 44, 46.

Figure 4B:
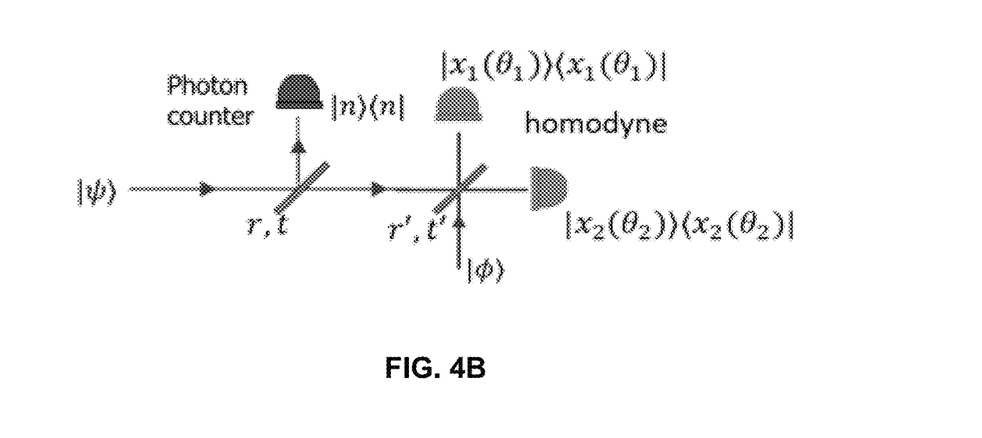
FIG. 4B is a diagram illustrating an equivalent partial PNR measurement system representing the PNR measurement system of FIG. 3A.

FIG. 4B is a diagram illustrating an equivalent partial PNR measurement system representing the PNR measurement system of FIG. 3A where the SPAD array is represented as the photon counter.

Figure 5A:
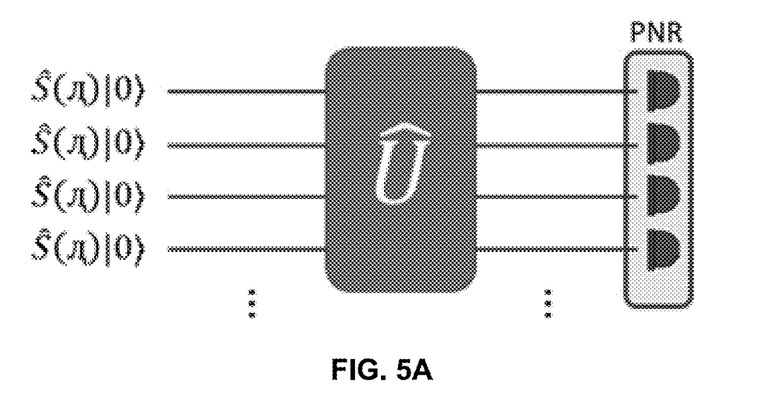
FIG. 5A is a diagram illustrating a Gaussian boson sampling (GBS) device that transforms a plurality of squeezed input states using a passive unitary operator and measures the resulting transformed states using photon-number-resolving detectors.

FIG. 5A is a diagram illustrating a Gaussian boson sampling (GBS) device that transforms a plurality of squeezed input states (e.g., a plurality of input optical fields having squeezed quantum states) using a passive unitary operator (e.g., an optical interferometer) and measures the resulting transformed states using photon-number-resolving (PNR) detectors. In some cases, the GBS device transmits the squeezed input states through a passive unitary operator comprising beam splitters and phase shifters before performing photon-number-resolving detection by the plurality of PNR detectors. In some embodiments, given a known interferometer, and corresponding known unitary operator $\hat{U}$, the output photon-number distribution sampled by the PNR detectors can be intractable for classical computers to calculate as the complexity grows exponentially in the number of modes. The problem can be intractable for approximate GBS devices where experimental imperfections such as noise and loss are present.

Figure 5B:
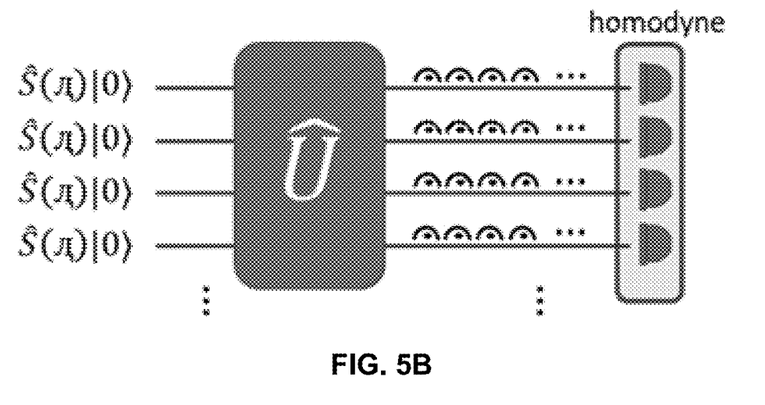
FIG. 5B a diagram illustrating a Gaussian boson sampling (GBS) device that transforms a plurality of squeezed input states using a passive unitary operator and measures the resulting transformed states using a plurality of partial photon-number-resolving systems each performing photon detection using a plurality of single photon detectors and at least one homodyne detection system performing homodyne detection.

FIG. 5B a diagram illustrating an example of a modified GBS device where segmented detectors perform partial PNR detection prior (e.g., immediately prior) to homodyne detection. In some cases, this Gaussian boson sampling (GBS) device transforms a plurality of squeezed input states using a passive unitary operator and measures the resulting transformed states using a plurality of partial photon-number-resolving systems each performing photon detection using a plurality of single photon detectors and at least one homodyne detection system. The configuration shown in FIG. 5B can be less complex (e.g., less computationally complex) compared to the setup shown in FIG. 5A and can eliminate the need for ideal PNR. In some embodiments, the homodyne detection at the end each output of the interferometer, $\hat{U}$, provides information correlated with the partial PNR measurements and thereby can be used to recover information about the distribution that would otherwise be lost when the homodyne detectors were replaced by a lossy channel.

Example Applications of Partial PNR Detection Method

As an application, partial PNR followed by homodyne detection described above may be used to modify the existing methods of Gaussian boson sampling (GBS). Some of the existing GBS devices take a Gaussian state which is completely described by its covariance matrix and sample all modes in the photon-number basis. The output distribution generated by these GBS devices can be provably hard for classical computers to calculate as the complexity scales exponentially with an increasing number of input modes that may be provided to the GBS device. In some implementations, these devices can receive a number of squeezed vacuum states (e.g., a number of optical fields having squeezed vacuum states) and are send these states through a multi-mode interferometer before photon-number detection. In some cases, a GBS device may have use cases in quantum chemistry, graph isomorphism, quantum state engineering, and other physically relevant areas of application. However, in some cases, the utility of a GBS device may degrade when PNR detectors have limited resolution and imperfect quantum efficiency. In some embodiments, the GBS method, may be modified by replacing a PNR detector at end of an output port of the GBS device with a series of partial PNR detectors followed by homodyne detection.

In some examples, when an existing GBS device samples from a distribution that is classically intractable to calculate even in the presence of loss, then modifying the GBS device by replacing a photodetector with a distributed photodetector followed by homodyne detection can be at worst equally as computationally difficult to simulate classically. In some cases, this can be shown by realizing that the proposed modification without the homodyne detection measurements (performing a partial trace over all modes sent to homodyne detection) recovers the GBS model where lossy PNR detection is used.

In some embodiments, a modified GBS method may comprise sampling a plurality of bosonic modes of a Gaussian state using partial PNR followed by homodyne detection. As such a modified GBS method may sample at least one of the bosonic modes of the plurality of bosonic modes both in photon-number basis and a quadrature basis. In some examples, the Gaussian state may be represented by its covariance matrix.

Advantageously, using homodyne measurement in partial PNR for sampling bosonic modes can improve the quantum efficiency of the detection process. In some cases, for example when high-efficiency field detectors are used, the quantum efficiency of such method may be close to unity. This method may be used to measure the energy of a state. Using a terminal PNR detector can be limited in efficiency and may have an upper bound in terms of resolvable photon-number. This introduces unavoidable decoherence and statistical mixing.

In some examples, the efficiency of a partial PNR detection having a homodyne detection as the complementary (or secondary) operation may not be affected by an upper bound for resolvable photon-number. In some examples, the SPDs or SPADs for photon counting and/or the detectors (e.g., photodetectors) used for homodyne detection may operate below a saturation regime. In some cases, performing homodyne detection on a portion of bosonic mode (optical mode) not absorbed by the SPADs, that would otherwise be lost by a terminal PNR detection scheme, can better preserve state purity. In some embodiments, the information obtained by the homodyne detection (e.g., a quadrature measurement) can be correlated with the partial PNR detection and can be used in determining state statistics (e.g., photon statistic in the corresponding bosonic mode).

In order to relate the detection statistics of the modified method based on partial PNR detection to the existing GBS scheme, the measured probabilities for an individual mode can be analyzed and expressed as:

$$P(n, x_{\theta=0}) = Tr\left[\hat{Z}^\dagger(rx)\hat{S}^\dagger(-lnt)e^{-\frac{(tx+r\hat{P})^2}{2}}|n\rangle\langle n|e^{-\frac{(tx+r\hat{P})^2}{2}}\hat{S}(-lnt)\hat{Z}(rx)\rho\right],$$

where ρ is the density matrix of the measured mode. The single-mode detection probability without homodyne detection in the existing scheme is given by:

$$P'(n)=Tr[|n\rangle<\rho].$$

Using the cyclic property of the trace, we can see that the probability we measure is the same as the existing probability, except that the density matrix has first be squeezed by a fixed amount and displaced in phase-space by a value depending on the measurement result:

$$P(n, x_{\theta=0}) = Tr\left[|n\rangle\langle n|e^{-\frac{(tx+r\hat{P})^2}{2}}\hat{S}^\dagger(-lnt)\hat{Z}(rx)\rho\hat{Z}^\dagger(rx)\hat{S}(-lnt)e^{-\frac{(tx+r\hat{P})^2}{2}}\right].$$

Additionally, the factor of $$e^{-\frac{(tx+r\hat{Q})^2}{2}}$$

acts to slightly asymmetrically damp the state in phase-space. This damping may be small when the majority (but not necessarily all) of the photons are detected by partial PNR before homodyne detection. By using the results of the homodyne measurements, we can relate the conditional probability $P(n|x_\theta)$ to $P'(n)$ through statistical transformations in post-processing. Thus, the modified method may preserve the sampling power of the GBS device while reducing the strict requirements on the quality of PNR detection.

In some embodiments, instead of homodyne detection, the operation after partial PNR may simply be a reflection of the light so that it propagates back through the waveguide. This allows the light to traverse the detector (or the distributed detector) in a double-pass configuration so that unabsorbed photons can be absorbed in the second pass and unfired single photon detectors have a second chance to detect light. A further generalization of this configuration may be realized by placing one or more single photon detectors forming the segmented detector (or the distributed photodetector) onto a portion of a waveguide configuration that forms or is coupled to a resonant optical cavity, such as a ring-resonator or a Bragg-grating resonator. In this case, the light can be confined and recirculated within the resonator or cavity for many cycles to allow for multiple interactions of unabsorbed light with a detecting element of the segmented detector. In some cases, when the number of single photon detector elements in the distributed (or segmented detector) are larger than a threshold number and the number of photons in the measured optical field (the measured quantum state) is small, the probability for any one of the single photon detectors to absorb two or more photons can be made low and the number of physical single photon detector elements needed to detect all photons in the state can be reduced, by passing the unabsorbed photons through the single photon detector elements of the distributed photodetector multiple times (e.g., by optically coupling the single photon detector elements to an optical cavity that recirculates light).

As another application, the detection scheme disclosed (partial PNR followed by homodyne detection) may be used for quantum state tomography. This is an adaptation of the overlap tomography measurement schemes, which can be used to both reduce the number of measurement settings required by other tomography schemes and ensure the reconstructed density matrix remains physical. The measurement probability for this detection described above can be reinterpreted as the overlap coefficient between an unknown quantum state, ρ, and a transformed Fock state. By additionally performing homodyne detections in the $$\theta = \frac{\pi}{2}$$

basis, we can additionally recover terms of the form:

$$P(n, x_{\theta=\pi/2}) = Tr\left[\hat{X}(rx)\hat{S}^\dagger(-lnt)e^{-\frac{(tx+r\hat{Q})^2}{2}}|n\rangle\langle n|e^{-\frac{(tx+r\hat{Q})^2}{2}}\hat{S}(-lnt)\hat{X}(rx)\rho\right],$$

By collecting statistics at each homodyne measurement basis, we can measure the quantum state overlap between ρ and squeezed, damped Fock states that have been translated in orthogonal directions in phase-space. This allows one to write a matrix equation of the form O=CP, where O is a column vector containing all measured overlaps (probability measurements), C is a coefficient matrix describing the overlap coefficients between the transformed Fock states and untransformed Fock states, and P is the unknown density matrix written out in Louivillian form as a column vector. Written out, this looks like:

$$\begin{pmatrix} O^{(0)} \\ O^{(1)} \\ \vdots \\ O^{N_p} \end{pmatrix} = \begin{pmatrix} c_0^0 c_0^{0*} & c_0^0 c_1^{0*} & \cdots & c_0^0 c_N^{0*} \\ c_0^1 c_0^{1*} & c_0^1 c_1^{1*} & \cdots & c_N^1 c_N^{1*} \\ \vdots & \vdots & \ddots & \vdots \\ c_0^{N_p} c_0^{N_p*} & c_0^{N_p} c_0^{N_p*} & \cdots & c_N^{N_p} c_N^{N_p*} \end{pmatrix} \begin{pmatrix} \rho_{0,0} \\ \rho_{0,1} \\ \vdots \\ \rho_{N,N} \end{pmatrix}.$$

From here, it is possible to invert the coefficient matrix and calculate the density matrix as $P=C^{-1}O$. However, any experimental noise in the system can lead to numerical instabilities in the matrix inversion process that can give rise to non-physical results. To prevent this, we can instead solve the semi-definite programming (SDP) program as given by:

$$\underset{P}{\text{Minimize}} \quad \|O - CP\|_2$$

Subject to $\rho \geq 0$ and $Tr[\rho] = 1$, where the constrains ensure that the reconstructed density matrix is physical. This minimization can be efficiently solved as a constrained SDP optimization problem. Sending each mode of a multimode state to a detection set up with partial PNR followed by homodyne measurement will extend this result for multi-mode tomography, which could prove more efficient than measurements schemes without any form of photon-number detection. This scheme may also have advantages over measurements schemes relying solely on PNR detection, as our scheme is not limited by the energy in the unknown quantum state and the individual single photon detector detection efficiency can be effectively improved by including many detectors.

Further applications of the current disclosure can be conceived where one includes other detection schemes involving ancillary states. For instance, instead of interfering with a classical LO for homodyne detection after a quantum state travels through a waveguide having a segmented detector used for partial PNR, the undetected light may interfere with a different quantum state before being sent to future detection. An example of this could be interfering the undetected light at a mode-coupler with an ancillary squeezed vacuum state before sending both output modes to separate homodyne detection schemes. Ancillary states could also be non-Gaussian, such as single-photon states, cat states, GKP state, or other bosonic code states.

EXAMPLE EMBODIMENTS

Various additional example embodiments of the disclosure can be described by the following clauses:

Example 1. A method for performing partial photon-number-resolving (PNR) detection on a bosonic mode to generate results of measuring the bosonic mode in photon number basis and at least one other basis, the method comprising:

coupling a portion of the bosonic mode to a plurality of single-photon detectors (SPDs), wherein a first portion of the coupled portion of the bosonic mode is absorbed by the plurality of SPDs to generate a result of measuring the bosonic mode in the photon number basis;

combining a second portion of the coupled portion of the bosonic mode with an uncoupled portion of the bosonic mode to generate a first transmitted portion of the bosonic mode, the second portion of the coupled portion of the bosonic mode comprising an unabsorbed portion of the coupled portion of the bosonic mode; and performing an operation on a final transmitted portion of the bosonic mode to generate the result of measuring the bosonic mode in the at least one other basis, wherein the final transmitted portion of the bosonic mode comprises at least the first transmitted portion of the bosonic mode.

Example 2. The method of Example 1, wherein the operation comprises homodyne detection.

Example 3. The method of Example 1, wherein the at least one other basis comprises a quadrature basis.

Example 4. The method of any of Examples 2-3, wherein performing the operation comprises interfering the final transmitted portion with an ancillary bosonic mode to generate two output bosonic modes and performing a balanced homodyne detection based on the two output bosonic modes.

Example 5. The method of Example 4, wherein the ancillary bosonic mode comprises a local oscillator.

Example 6. The method of Example 4, wherein the ancillary bosonic mode comprises a non-Gaussian mode.

Example 7. The method of Example 4, wherein the ancillary bosonic mode comprises a squeezed vacuum state.

Example 8. The method of any of Examples 1-7, wherein a first coupling coefficient between the bosonic mode and at least one of the SPDs is adjustable.

Example 9. The method of Example 8, wherein coupling a portion of the bosonic mode to the plurality of single-photon detectors (SPDs) comprises adjusting at least the first coupling coefficient to increase the first transmitted portion of the bosonic mode.

Example 10. The method of any of Examples 1-9, further comprising coupling the first transmitted portion of the bosonic mode to the plurality of SPDs to generate a second transmitted portion of the bosonic mode, wherein the final transmitted portion of the bosonic mode comprises the second transmitted portion of the bosonic mode.

Example 11. The method of any of Examples 1-10, further comprising generating a plurality of transmitted portions of the bosonic mode wherein a transmitted portion of the plurality of transmitted portions of the bosonic mode is generated by coupling a portion of a previously generated transmitted portion of the bosonic mode to the plurality of SPDs.

Example 12. The method of any of Examples 1-11, wherein the bosonic mode comprises a guided bosonic mode.

Example 13. The method of any of Examples 1-11, wherein the bosonic mode comprises an optical mode.

Example 14. The method of Example 13, wherein the optical mode is confined and propagates in an optical waveguide.

Example 15. The method of Example 14, wherein the optical waveguide comprises an on-chip optical waveguide.

Example 16. The method of Example 15, wherein the optical waveguide comprises a silicon waveguide.

Example 17. The method of Example 15, wherein performing the operation comprises splitting the final transmitted portion of the bosonic mode using at least one beam splitter.

Example 18. The method of Example 15, wherein performing the operation comprises detecting photons using an on-chip photodetector.

Example 19. The method of Example 18, wherein the on-chip photodetector is integrated with the optical waveguide.

Example 20. The method of Example 2, wherein the bosonic mode is entangled to one or more other bosonic modes, the bosonic mode and the one or more other bosonic modes having a joint quantum state, wherein the result of measuring the bosonic mode in the photon number basis comprises detection of at least one photon.

Example 21. A method for bosonic non-Gaussian quantum state engineering, the method comprising:
provided a quantum state entangled across one or more bosonic modes; and
performing a partial photon-number-resolving (PNR) detection on the bosonic mode using the method of Example 2 to project the one or more bosonic modes of the quantum state into a non-Gaussian state;
wherein the result of measuring the bosonic mode in the photon number basis comprises detection of at least one photon.

Example 22. The method of any of Examples 20-21, wherein the bosonic mode and the one or more other bosonic modes are within a cluster of entangled bosonic modes.

Example 23. The method of Example 2, wherein bosonic mode comprises a transformed bosonic mode transformed by a multi-mode interferometer and at least one phase shifter, wherein the transformed bosonic mode is generated by a unitary transformation.

Example 24. A method for performing a quantum sampling problem that is intractable using a classical computing method, the method comprising:
preparing a plurality of bosonic modes each having an initial state;
performing a unitary transformation on the plurality of bosonic modes by transmitting the plurality of bosonic modes through a multi-mode interferometer and at least one phase shifter to generate transformed bosonic modes having transformed states; and
performing the partial photon-number-resolving (PNR) detection on at least one transformed bosonic mode using the method of Example 2.

Example 25. The method of Example 24, wherein the initial state comprises a squeezed vacuum state.

Example 26. The method of any of Examples 24-25, wherein the multi-mode interferometer comprises at least one beam splitter.

Example 27. A method for performing quantum state tomography of a quantum state of a bosonic mode by at least preparing a matrix equation for calculating a density matrix associated with the quantum state, the method comprising:
generating a plurality of replicated bosonic modes each having a quantum state identical to the quantum state;
performing a partial photon-number-resolving (PNR) detection on each of the plurality of replicated bosonic modes of the plurality of replicated bosonic modes using the method of Example 2;
receiving outcomes of performing an operation on a final transmitted portion of each of replicated bosonic modes by a classical computing system, wherein the outcomes comprise quadrature and photon number measurement results, and wherein the classical computing system comprises at least one hardware processor;
processing the outcomes by a hardware processor to generate a measurement statistic of the quadrature and photon number measurement results;
receiving the measurement statistic; and
preparing, by the hardware processor, the matrix equation having a form $M-C\times P=0$, where M comprises the measurement statistic, C comprises a fixed coefficient matrix, and P comprises the matrix associated with the quantum state of the bosonic mode.

Example 28. The method of Example 27, further comprising, by the hardware processor, solving the matrix equation using a minimization method.

Example 29. The method of Example 28, wherein the minimization method comprises a semi-definite programming subjected to a physicality constraint.

Example 30. The method of Example 28, wherein the bosonic mode comprises a bosonic mode of a plurality of bosonic modes of a multi-mode quantum system, the method further comprising:
generating a second plurality of replicated bosonic modes each having a quantum state identical to a quantum state of a bosonic mode of the plurality of bosonic modes;
performing a partial photon-number-resolving (PNR) detection on each of the second plurality of replicated bosonic modes using the method of Example 2;
receiving, by the classical computing system, outcomes of performing an operation on a final transmitted portion of each of replicated bosonic modes of the second plurality of replicated bosonic modes, wherein the outcomes comprise secondary quadrature and photon number measurement results;
processing the outcomes by the hardware processor to generate a second measurement statistic of the secondary quadrature and photon number measurement results;
receiving the second measurement statistic; and
preparing, by the hardware processor, a second matrix equation having a form $M_2-C_2\times P_2=0$, where $M_2$ comprises the second measurement statistics, $C_2$ comprises a fixed coefficient matrix, and $P_2$ comprises a second matrix associated with the quantum state of the second bosonic mode.

Example 31. A method for performing partial photon-number-resolving (PNR) detection on a bosonic mode to generate results of measuring the bosonic mode in photon number basis and at least one other basis; the method comprising:
coupling a portion of the bosonic mode to a plurality of single-photon detectors (SPDs) to generate the result of measuring the bosonic mode in the photon number basis;
generate a transmitted portion of the bosonic mode using an uncoupled portion and an unabsorbed portion of the coupled portion of the bosonic mode; and
performing an operation on the transmitted portion of the bosonic mode to generate the result of measuring the bosonic mode in the at least one other basis.

Example 32. A quantum measurement system configured to perform partial photon-number-resolving (PNR) detection on a bosonic mode to generate results of measuring the bosonic mode in photon number basis and at least one other basis, the quantum measurement system comprising:
a plurality of single-photon detectors (SPDs) configured to receive a coupled portion of the bosonic mode and partially absorb the coupled portion to generate a result of measuring the bosonic mode in the photon number basis; and
a complementary measurement system configured to perform an operation on a final transmitted portion of the bosonic mode to generate the result of measuring the bosonic mode in the at least one other basis, wherein the final transmitted portion of the bosonic mode comprises an uncoupled portion and an unabsorbed portion of the coupled portion of the bosonic mode.

Example 33. A quantum measurement system configured to perform partial photon-number-resolving (PNR) detection on a bosonic mode to generate results of measuring the bosonic mode in photon number basis and at least one other basis, the quantum measurement system comprising:

a plurality of single-photon detectors (SPDs) configured to receive a coupled portion of the bosonic mode and absorb a first portion of the coupled portion to generate a result of measuring the bosonic mode in the photon number basis; and a complementary measurement system configured to perform an operation on a final transmitted portion of the bosonic mode to generate a result of measuring the bosonic mode in the at least one other basis, wherein the final transmitted portion of the bosonic mode comprises at least a first transmitted portion of the bosonic mode;

wherein the first transmitted portion of the bosonic mode comprises at least an uncoupled portion of the bosonic mode and an unabsorbed portion of the coupled portion of the bosonic mode.

Example 34. The system of any of Examples 32-33, wherein the complementary measurement system is configured to perform homodyne detection.

Example 35. The system of any of Examples 32-34, wherein the other basis comprises a quadrature basis.

Example 36. The system of Example 34, wherein the complementary measurement system is configured to interfere the final transmitted portion of the bosonic mode with a reference bosonic mode to generate two output bosonic modes and performing a balanced detection on the two output bosonic modes.

Example 37. The system of Example 36, wherein the reference bosonic mode comprises a local oscillator.

Example 38. The system of Example 33, wherein a first coupling coefficient between the bosonic mode and at least one of the SPDs is adjustable.

Example 39. The system of Example 38, wherein at least the first coupling coefficient is configured to increase the first transmitted portion of the bosonic mode.

Example 40. The system of Example 33, wherein a portion of the first transmitted portion of the bosonic mode is coupled to the plurality of the SPDs to generate a second transmitted portion of the bosonic mode, and the final transmitted portion of the bosonic mode comprises the second transmitted portion of the bosonic mode.

Example 41. The system of Example 33, wherein the final transmitted portion of the bosonic mode comprises a plurality of transmitted portions of the bosonic mode, and wherein a transmitted portion of the plurality of transmitted portions of the bosonic mode is generated by coupling a portion of a previously generated transmitted portion of the bosonic mode to the plurality of SPDs.

Example 42. The system of any of Examples 33-41, wherein the bosonic mode comprises a guided bosonic mode.

Example 43. The system of any of Examples 33-41, wherein the bosonic mode comprises an optical mode.

Example 44. The system of Example 43, wherein the optical mode is confined and propagates in an optical waveguide.

Example 45. The system of Example 44, wherein the optical waveguide comprises an on-chip optical waveguide.

Example 46. The system of Example 44, wherein the optical waveguide comprises a silicon waveguide.

Example 47. The system of Example 45, wherein performing the operation comprises splitting the final transmitted portion of the bosonic mode using at least one beam splitter.

Example 48. The system of Example 45, wherein performing the operation comprises detecting photons using an on-chip photodetector.

Example 49. The system of Example 48, wherein the on-chip photodetector is integrated with the optical waveguide.

Example 50. A method for performing distributed photon-number-resolving (PNR) detection on a bosonic mode to generate results of measuring the bosonic mode in photon number basis, the method comprising:

coupling a portion of the bosonic mode to a plurality of single-photon detectors (SPDs), wherein a first portion of the coupled portion of the bosonic mode is absorbed by the plurality of SPDs;

combining a second portion of the bosonic mode with an uncoupled portion of the bosonic mode to generate a first transmitted portion of the bosonic mode, the second portion comprising an unabsorbed portion of the coupled portion of the bosonic mode;

coupling a portion of the first transmitted portion to the plurality of single-photon detectors (SPDs), wherein a first portion of the coupled portion of the first transmitted portion is absorbed by the plurality of SPDs;

combining a second portion of the first transmitted portion with an uncoupled portion of the first transmitted portion to generate a second transmitted portion of the bosonic mode, the second portion of the first transmitted portion comprising a second unabsorbed portion of the coupled portion of the first transmitted portion; and generating the results of measuring the bosonic mode in photon number basis based at least in part on signals generated by the plurality of SPDs upon absorbing the first portion of the coupled portion of the bosonic mode and first portion of the coupled portion of the first transmitted portion of the bosonic mode.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware. Further, the computing system may include, be implemented as part of, or communicate with, a computation network or a cloud computing system.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together. The terms "in one/some case(s)" or "in one/some implementation(s)" represent various embodiments.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Many variations and modifications may be made to the above-described embodiments, the elements of which are to be understood as being among other acceptable examples. All such modifications and variations are intended to be included herein within the scope of this disclosure.

What is claimed is:

1. A method for performing partial photon-number-resolving (PNR) detection on a bosonic mode to generate results of measuring the bosonic mode in photon number basis and at least one other basis, the method comprising:
    coupling a portion of the bosonic mode to a plurality of single-photon detectors (SPDs), wherein a first portion of the coupled portion of the bosonic mode is absorbed by the plurality of SPDs to generate a result of measuring the bosonic mode in the photon number basis;
    combining a second portion of the coupled portion of the bosonic mode with an uncoupled portion of the bosonic mode to generate a first transmitted portion of the bosonic mode, the second portion of the coupled portion of the bosonic mode comprising an unabsorbed portion of the coupled portion of the bosonic mode; and
    performing an operation on a final transmitted portion of the bosonic mode to generate the result of measuring the bosonic mode in the at least one other basis, wherein the final transmitted portion of the bosonic mode comprises at least the first transmitted portion of the bosonic mode.

2. The method of claim 1, wherein the operation comprises homodyne detection.

3. The method of claim 1, wherein the at least one other basis comprises a quadrature basis.

4. The method of any of claim 2, wherein performing the operation comprises interfering the final transmitted portion with an ancillary bosonic mode to generate two output bosonic modes and performing a balanced homodyne detection based on the two output bosonic modes.

5. The method of claim 4, wherein the ancillary bosonic mode comprises a local oscillator.

6. The method of claim 4, wherein the ancillary bosonic mode comprises a non-Gaussian mode.

7. The method of claim 4, wherein the ancillary bosonic mode comprises a squeezed vacuum state.

8. The method of claim 1, wherein a first coupling coefficient between the bosonic mode and at least one of the SPDs is adjustable.

9. The method of claim 8, wherein coupling a portion of the bosonic mode to the plurality of single-photon detectors (SPDs) comprises adjusting at least the first coupling coefficient to increase the first transmitted portion of the bosonic mode.

10. The method of claim 1, further comprising coupling the first transmitted portion of the bosonic mode to the plurality of SPDs to generate a second transmitted portion of the bosonic mode, wherein the final transmitted portion of the bosonic mode comprises the second transmitted portion of the bosonic mode.

11. The method of claim 1, further comprising generating a plurality of transmitted portions of the bosonic mode wherein a transmitted portion of the plurality of transmitted portions of the bosonic mode is generated by coupling a portion of a previously generated transmitted portion of the bosonic mode to the plurality of SPDs.

12. The method of claim 1, wherein the bosonic mode comprises a guided bosonic mode.

13. The method of claim 1, wherein the bosonic mode comprises an optical mode.

14. The method of claim 13, wherein the optical mode is confined and propagates in an optical waveguide.

15. The method of claim 14, wherein the optical waveguide comprises an on-chip optical waveguide.

16. The method of claim 15, wherein the optical waveguide comprises a silicon waveguide.

17. The method of claim 15, wherein performing the operation comprises splitting the final transmitted portion of the bosonic mode using at least one beam splitter.

18. The method of claim 15, wherein performing the operation comprises detecting photons using an on-chip photodetector.

19. The method of claim 18, wherein the on-chip photodetector is integrated with the optical waveguide.

20. The method of claim 2, wherein the bosonic mode is entangled to one or more other bosonic modes, the bosonic mode and the one or more other bosonic modes having a joint quantum state, wherein the result of measuring the bosonic mode in the photon number basis comprises detection of at least one photon.

* * * * *